United States Patent [19]

Ozeki

[11] Patent Number: 4,533,048
[45] Date of Patent: Aug. 6, 1985

[54] FILM JACKET

[75] Inventor: Jiro Ozeki, Tokyo, Japan

[73] Assignee: Slidex Corporation, Tokyo, Japan

[21] Appl. No.: 525,268

[22] Filed: Aug. 22, 1983

Related U.S. Application Data

[63] Continuation of Ser. No. 311,021, Oct. 13, 1981, abandoned.

[30] Foreign Application Priority Data

Nov. 6, 1978 [JP] Japan ................... 53-136593

[51] Int. Cl.³ ............................. B65D 85/48
[52] U.S. Cl. ..................... 206/455; 206/456;
229/76; 40/159
[58] Field of Search ........... 206/455, 456, 83;
40/159; 229/76, 72

[56] References Cited

U.S. PATENT DOCUMENTS 2,968,882  1/1961  Ozeki .
3,685,187  8/1972  Hillmer .
3,807,850  4/1974  Ozeki .
3,826,422  7/1974  Dickinson ................. 229/72
3,850,083  11/1974  Falcon ..................... 229/72
3,952,871  4/1976  Erickson .
3,979,051  9/1976  Close .
4,170,081  10/1979  Kiejzik .

FOREIGN PATENT DOCUMENTS 2511946  4/1974  Fed. Rep. of Germany .
7604667  1/1977  Fed. Rep. of Germany .
1864025  11/1977  Fed. Rep. of Germany .
1319905  6/1973  United Kingdom ........... 206/455
1492571  11/1977  United Kingdom .

Primary Examiner—Joseph Man-Fu Moy
Attorney, Agent, or Firm—Fleit, Jacobson, Cohn & Price

[57] ABSTRACT

A film jacket comprising a base sheet, one or more transparent surface sheets, each having three edges thereof fixed to the base sheet so as to form pockets, and cover members fixed to the base sheet for covering extended portions of films outside the pockets, whereby firmly holding films at desired positions.

15 Claims, 10 Drawing Figures

FILM JACKET

This application is a continuation of application Ser. No. 311,021, filed Oct. 13, 1981, now abandoned.

BACKGROUND OF THE INVENTION

1. Field of the Invention

The invention relates to a film jacket, and more particularly to a film jacket having such pockets that firmly hold photographed long films or separate individual frames of photographed film at desired positions thereof in an easily insertible and removable fashion.

2. Description of the Prior Art

There are various film jackets with pockets currently available in the market, such as a film jacket comprising a base sheet and surface sheets, each surface sheet having three side edges thereof sealedly connected to the base sheet so as to form pockets between the base sheet and the surface sheets, long films are inserted into individual pockets through openings between the non-sealed edge of each surface sheet and the base sheet. In another commonly used film jacket of known type, a base sheet and surface sheets are welded together along spaced rectilinear lines in parallel with one side edge of the base sheet, so as to form pockets between adjacent rectilinear welded portions, and long films are inserted into the pockets through openings between non-welded edges of the surface sheets and the base sheet.

The film jackets of the prior art as mentioned above have shortcoming in that the film placed in the pockets tend to be easily removed away from the pockets, especially in the first mentioned type film jacket, and that the film cannot be held firmly at a desired position of the pocket and a number of separate individual frames of film cannot be held in one pocket in an ordinary manner. With the aforesaid second type known film jacket, it is very difficult to insert one frame of film to a desired position of any pocket.

SUMMARY OF THE INVENTION

Therefore, an object of the present invention is to obviate the aforesaid shortcoming of the prior art, by providing a novel film jacket which comprises a base sheet, at least one surface sheet made of transparent plastic sheet, each of said surface sheet having three side edges thereof fixed to said base sheet while keeping one side edge thereof left open for forming a pocket between the surface sheet and the base sheet with an opening at said open side edge for receiving a film therein, and at least one cover member fixed to said base sheet along said open side edge of the surface sheet so as to cover that portion of the film in the pocket which extends outside the pocket, the spacing between the fixed portion of the cover member to the base sheet and the fixed portion of the surface sheet to the base sheet in parallel with the fixed portion of the cover member being slightly wider than width of the film to be inserted in the pocket. With the film jacket of the invention, the cover member prevents accidental removal of the film from the pocket without failure, and the space between the fixed portion of the cover member and the fixed portion of the surface sheet in parallel with the fixed portion of the cover member is so set as to reliably hold the film at a desired position in the pocket by grasping the film between the base sheet on one side and the surface sheet and the cover member on the opposite side, regardless of the length of or the number of frames in the film.

BRIEF DESCRIPTION OF THE DRAWING

For a better understanding of the invention, reference is taken to the accompanying drawing, in which.

DESCRIPTION OF THE PREFERRED EMBODIMENTS

Figure 1:
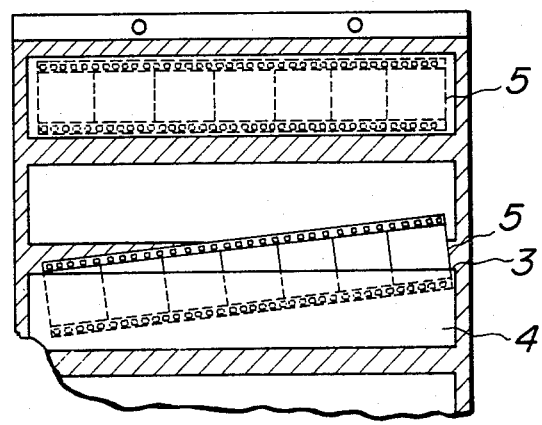
FIGS. 1 and 2 are partial views of known film jackets, respectively.

FIG. 1 shows a known film pocket in which long films 5 are inserted into pockets 4 through upper openings 3 between non-welded upper edges of surface sheets and a base sheet.

Figure 2:
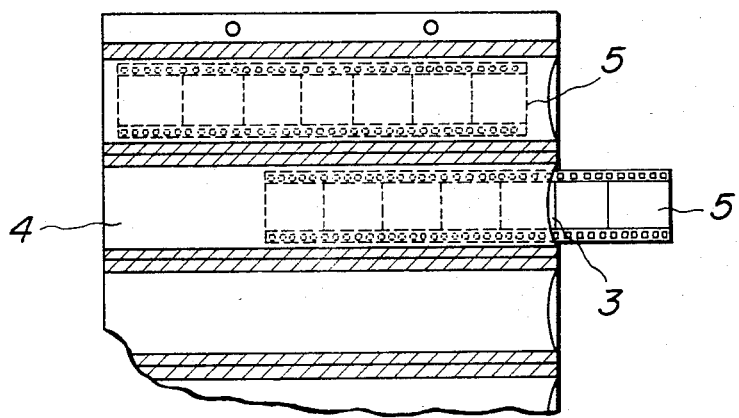

FIG. 2 shows another known film pocket in which long films 5 are inserted into pockets 4 through end openings 3 between non-welded end edges of surface sheets and a base sheet.

The film jackets of the prior art as shown in FIGS. 1 and 2 have shortcoming in that the films 5 placed in the pockets 4 tend to be easily removed away from the pockets 4, especially in the film jacket shown in FIG. 1, and that the film 5 cannot be held firmly at a desired position of the pocket 4 and a number of separate individual frames of film cannot be held in one pocket 4 in an orderly manner. With the known film jacket shown in FIG. 2, it is very difficult to insert one frame of film to a desired position of any pocket 4.

Figure 3:
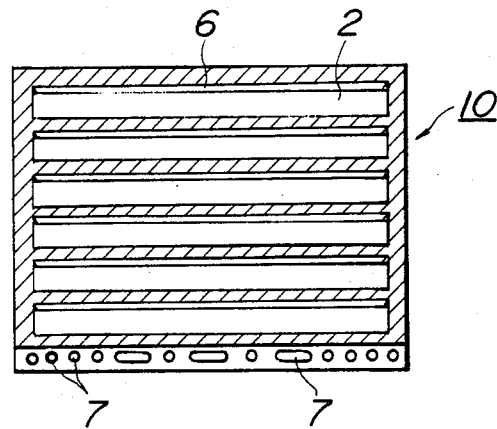
FIG. 3 is a front view of a film jacket, as an embodiment of the present invention.
Figure 4:
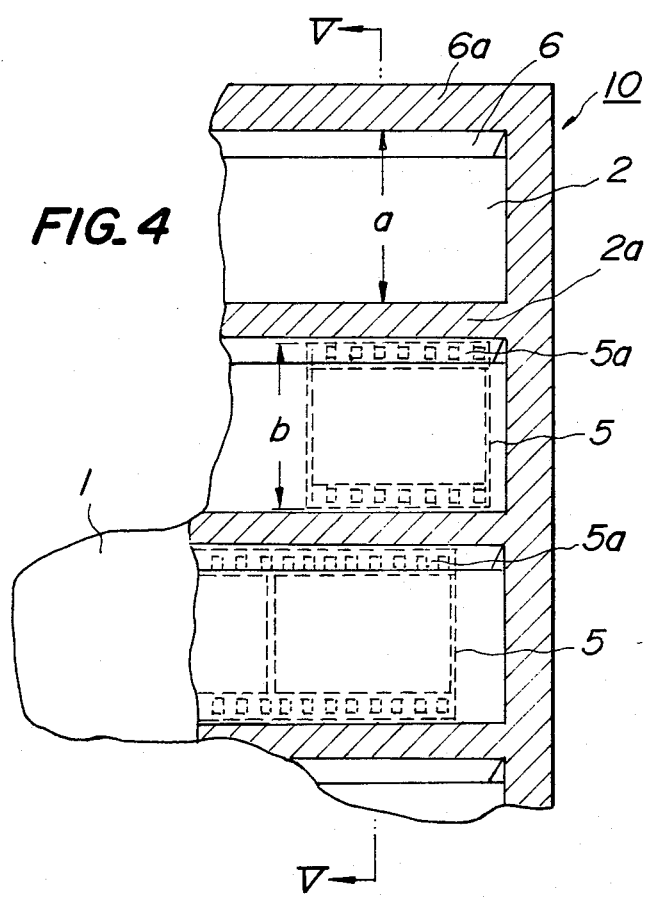
FIG. 4 is a partial view of the film jacket of FIG. 3 at a large scale.
Figure 5:
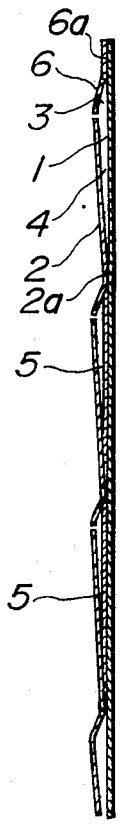
FIG. 5 is a sectional view taken along the line V—V of FIG. 4.

Referring to FIG. 3 showing a front view of a film jacket 10 embodying the present invention, FIG. 4 showing a part of the film jacket at a large scale, and FIG. 5 showing a sectional view taken along the line V—V of FIG. 4, a base sheet 1 is made of a sheet of paper or a transparent or translucent sheet of plastic material, such as polypropylene, polyethylene, or polyester, and a plurality of surface sheets 2 made of transparent plastic sheets are disposed in parallel with each other on the base sheet 1 with suitable spacing therebetween for removably receiving films 5 between the base sheet 1 and the surface sheets 2. Three side edges of each surface sheet 2, i.e., the lower horizontal side edge and the opposing vertical side edges as seen in FIG. 3, are fixed to the base sheet 1 by welding or by adhesive, as shown by shaded portions of FIGS. 3 and 4, while leaving an opening 3 at the upper portion of each surface sheet 2 as seen in FIG. 5. Thereby, a pocket 4 is defined between the base sheet 1 and each surface sheet 2, and the film 5 can be inserted into the pocket 4 through the opening 3 in a removable fashion. In this embodiment, the film 5 to be carried by the pocket 4 is a bare film without being covered by any mount. The depth of each pocket 4, as measured at right angles to the longitudinal direction of the opening 3, is so selected that when one end of the film 5 engages the bottom of the pocket 4 or the fixed portion between the surface sheet 2 and the base sheet 1, a small part of the film, preferably the upper perforated portion 5a as seen in FIG. 4, extends to the outside of the pocket 4. A transparent cover member 6 is fixed to the base sheet 1 along each opening 3 of each pocket 4 at a portion 6a in such a manner that a non-fixed lower edge of the cover member 6 as seen in FIGS. 3 and 4 is in juxtaposition with the opening side edge of the surface sheet 2. Whereby, that part of the film 5 which extends outside the pocket 4, such as the upper perforated portion 5a, can be covered by the cover member 6. In a preferred embodiment of the invention, the lower edge of the cover member 6 as seen in FIGS. 3 and 4 extends toward the surface sheet 2 until coming into abutting engagement with the free edge of the surface sheet 2, and after the film 5 is inserted in the pocket 4 in position, the cover member 6 is overlaid on the aforesaid extended portion of the film, e.g., on the upper perforated portion 5a of the film 5. The abutting engagement between the opening side edge of the surface sheet 2 and the non-fixed side edge of the cover member 6 is useful in preventing dust particles from entering into the pocket 4 for protection of the film therein. The aforesaid abutting engagement between the surface sheet 2 and the cover member 6 is also advantageous in that, when a number of the film jackets 10 thus formed are filed in an album, extra thickness which might be caused by overlapped surface sheets and the cover members can be avoided.

According to the invention, it is important that the spacing a between the upper portion 6a of the cover member 6 fixed to the base sheet 1 and the lower portion 2a of the surface sheet 2 fixed to the base sheet 1 is determined such that the opposite upper and lower side edges of the film 5 are grasped by wedge action induced between the cover member 6 and the base sheet 1 on the one hand and between the surface sheet 2 and the base sheet 1 on the other hand without deforming the film 5, that is, the spacing a is slightly wider than the width b of the film, for instance by about 2 to 3 mm, as shown in FIG. 4. Whereby, the film 5 inserted in the pocket 4 is urged against the base sheet 1 by the resiliency inherent to the surface sheet 2 and the cover member 6, so that the film 5 can be reliably held at a desired inserted position by the aforesaid resiliency plus the frictional resistance between the film 5 and the base sheet 1, surface sheet 2, and the cover member 6.

Referring to FIG. 3, filing holes 7 are for filing the film jackets 10 thus formed in an album (not shown) by a suitable metallic binder (not shown), for instance, in a similar manner to that disclosed in U.S. Pat. No. 2,968,882.

With the aforesaid construction of the film jacket according to the present invention, when the film 5 is once inserted into the pocket 4 and covered by the cover member 6, not only any accidental removal of the film 5 from the film jacket is effectively prevented, but also a short one frame film or a long multi-frame film can be reliably held in position within the pocket 4 at the desired inserted position even when an external mechanical impact is applied to the film jacket, for instance, by dropping the film jacket from a table top to the floor. More particularly, any movement of the film 5 in the pocket 4, such as the movement in the lengthwise direction of the pocket 4 or horizontal direction in FIGS. 3 and 4, can be effectively prevented by a combination of the frictional forces between the film 5 and the sheets 1, 2 and the cover member 6 and the resilient forces in the proximity of the fixed portions 2a and 6a of the surface sheet 2 and the cover member 6 to the base sheet 1, so that the film 5 is always reliably held at a preselected inserted position.

As a result, if both the base sheet 1 and the surface sheets 2 are made of transparent plastic sheets, in addition to the orderly storage of the film in a reliable fashion while allowing inspection of the pictures of the films, it is possible to directly project the picture of any film frame by a suitable overhead or other type projector (not shown) without removing the film from the jacket 10. If the base sheet 1 is made of a translucent plastic sheet, diffused light beams through the translucent plastic base sheet facilitate excellent overall view of the entire films carried by the film jacket 10. If the base sheet 1 is made of a sheet of paper, such paper base sheet can support the film jacket 10.

Furthermore, an easily discernible opaque printed film may be provided on the fixed portions between the base sheet 1 and the surface sheets 2, the fixed portions between the base sheet 1 and the cover members 6, or those portions of the surface sheets 2 and the cover members 6 which face the fringe portions or the perforated portions of the films, for the purpose of further facilitating the identification of individual film frames. In addition, the use of such opaque printed films ensures a shield of light passing through the perforated portion of the film in the case of projecting the film jacket per se on a screen, thereby obtaining a fresh image without any halation.

Figure 6:
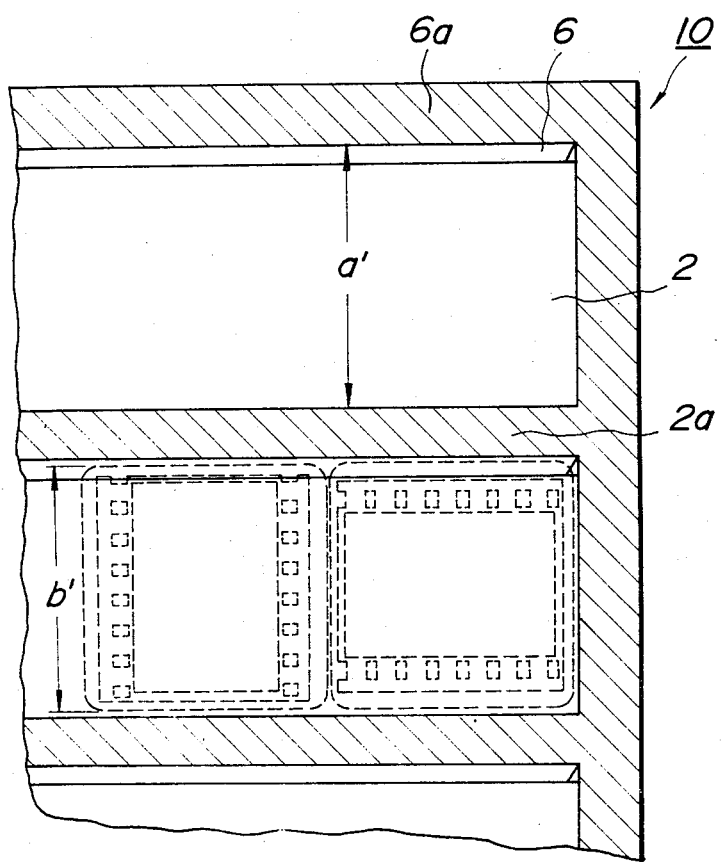
FIG. 6 is a partial view similar to FIG. 4, illustrating a modified embodiment of the present invention at a large scale.
Figure 7A:
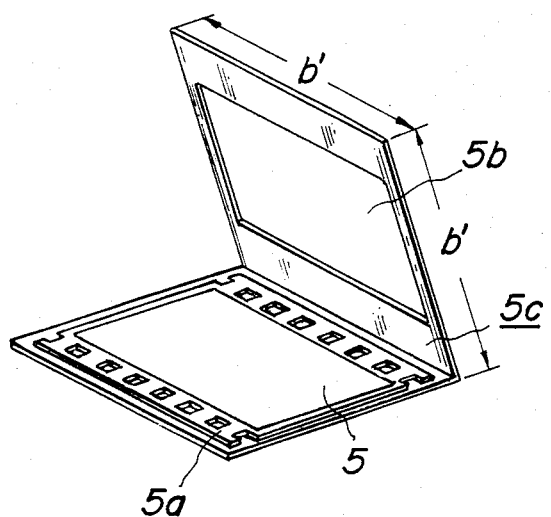
FIGS. 7a and 7b are perspective views, showing the manner in which a frame of film is grasped by two mounts or adhesively fixed onto a mount.
Figure 7B:
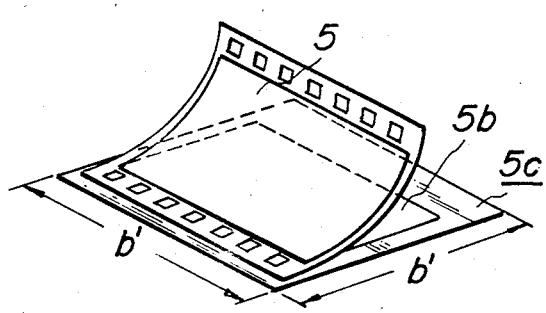

FIG. 6 shows a front view of a modified embodiment of the present invention, which is a film jacket for holding individual mounts carrying film frames at desired positions. The embodiment of FIG. 6 is intended to facilitate insertion of mounted films into pockets of the film jacket 10 always from one direction regardless of whether the upright direction of the picture of the mounted film coincides with the direction of width or length of the film frame, while ensuring the easy retrieval of the specific film frames and direct projection of the picture of any film frame without removing the film from the jacket 10. To fulfil this intent, each frame of the film 5 is mounted on a very thin mount 5c of square shape with a side length of b'. The thickness of the mount is, for instance, comparable with the thickness of the film 5. Each frame of the film 5 is either grasped by two coacting surface members of a mount 5c, as shown in FIG. 7a, or attached to a single sheet type mount 5c by adhesive, as shown in FIG. 7b. In either case, the picture of the frame of the film 5 can be seen through an open window 5b formed at the central portion of the mount 5c. The mount 5c carrying the film frame is inserted into the pocket 4 of the film jacket 10 of FIG. 6, in the same manner as in the preceding embodiment described hereinbefore by referring to FIGS. 3, 4 and 5.

Since each mount 5c is square, its width and length are both b' and identical.

With the embodiment of FIG. 6, the spacing a' between a lower portion 2a of a surface sheet 2 fixed to the base sheet 1 and an upper portion 6a of a cover member 6 fixed to the base sheet 1 is slightly larger than the side length b' of the mount 5c, for instance, by about 2 to 3 mm. Since the mount 5c carrying a frame of the film 5 is very thin, once being inserted into the pocket 4 at a desired position thereof, the mount 5c is reliably held at the desired inserted position selected at the time of insertion, by a combination of resilient forces of the surface sheet 2 and the cover member 6 in the proximity of the fixed portions 2a and 6a and frictional forces between the mount 5c and the base sheet 1, the surface sheet 2, and the cover member 6. The fixed portions 2a and 6a can be formed either by welding or by using a suitable adhesive.

With the film jacket 10 of FIG. 6, if the horizontal length of the pocket 4 as seen in the figure is selected to be equivalent to an integral multiple of the side length of one square mount 5c, a suitable number of the mounts 5c carrying individual frames of the film 5 can be inserted into the pocket 4 while keeping the pictures of the film 5 always in a desired direction, e.g., in the upright direction, regardless of whether the upright direction of the picture coincides with the widthwise direction or lengthwise direction of the individual film frame, because of the square shape of the mount 5c.

With the embodiment of FIG. 6, not only the single framed films 5, but also multiple framed films 5 can be of course inserted into the pocket 4 and reliably held therein.

Figure 8:
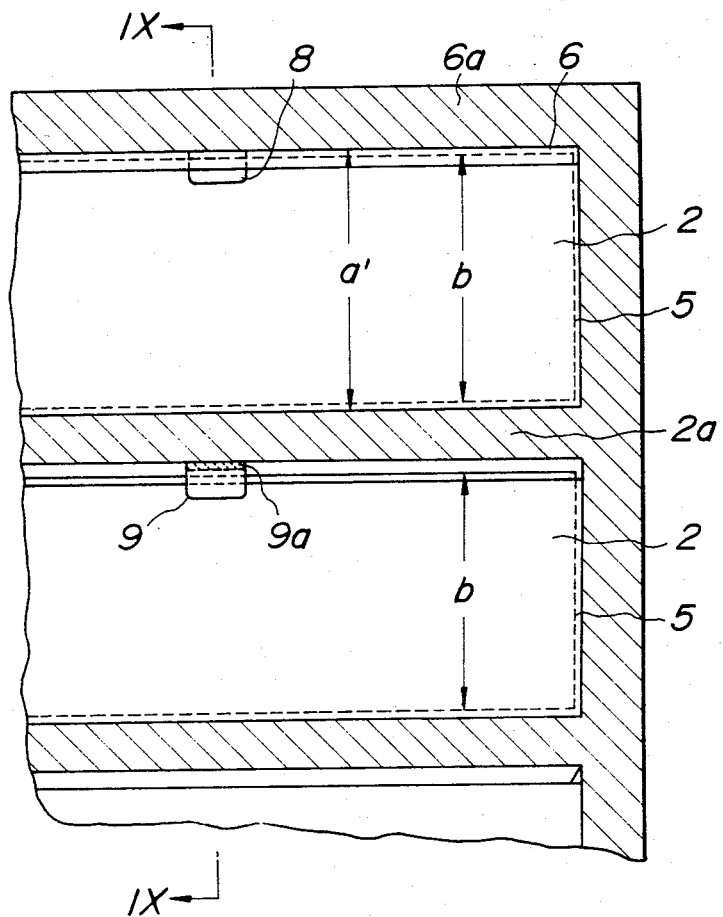
FIG. 8 is a front view of a further modified embodiment of the present invention.
Figure 9:
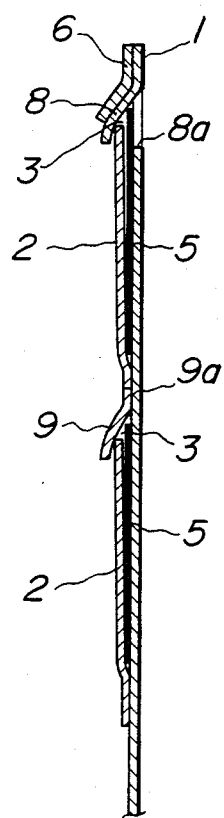
FIG. 9 is a sectional view taken along the line IX—IX of FIG. 8.

FIG. 8 shows a front view of a further modified embodiment of the present invention and FIG. 9 is a sectional view taken along the line IX—IX of FIG. 8. In the present embodiment, that portion 8a of the base sheet 1 which is slightly lower than the open edge 3 of each surface sheet 2 is cut into U-shaped one, for example, which is then bent so as to form a tongue 8 adapted to be engaged with the open edge 3 of the surface sheet 2 through the cover member 6.

Alternatively, a resilient piece 9 formed into U-shaped one, for example, may be secured at its upper edge 9a to the base sheet 1 so as to be engaged with the open edge 3 of the surface sheet 2. In this case, the cover member 6 is not always necessary and may be omitted as shown in FIGS. 8 and 9.

The tongue 8 together with the cover member 6 or the tongue 9 per se is capable of firmly holding the film 5 between the cover sheet 2 and the base sheet 1 and preventing accidental drop of the film 5 out of the pocket 4 of the film jacket.

As described in the foregoing, according to the present invention, photographed films can be reliably and easily held by a film jacket at desired positions regardless of the length of or number of frames in the film, while effectively preventing accidental drop of the film out of the pocket of the film jacket.

Although the invention has been described with a certain degree of particularity, it is understood that the present disclosure has been made only by way of example and that changes in details of construction and the combination and arrangement of parts may be resorted to without departing from the scope of the invention as hereinafter claimed.

What is claimed is:

1. A film jacket for receiving and holding a film having a length dimension and a width dimension, the film having a central image bearing portion positioned between marginal side portions, said film jacket comprising a base sheet; at least one surface sheet made of a transparent plastic sheet and having three side edges thereof fixed to said base sheet while keeping one side edge thereof left open for forming a pocket between the base sheet and the surface sheet, said pocket having a first dimension larger than one of the dimensions of the film received in the pocket and a second dimension smaller than the other dimension of the film so that a portion of the received film extends outside of the pocket, said first and second dimensions being such that all of the central image bearing portion of the film is received within said pocket; and at least one cover member fixed at only one edge to said base sheet along said open edge of said surface sheet so that said cover member covers at least a portion of the film received in said pocket which extends outside the pocket, the portion of said cover member fixed to the base sheet and the portion of said surface sheet fixed to said base sheet being parallel to said open edge and the spacing between the fixed portions being slightly wider than the other dimension of the film received into said pocket, said at least one cover member having only one edge fixed to said base sheet, other said edges thereof being separated from said base sheet so that the other side edges of said at least one cover member are movable away from said sheet to facilitate insertion of film into said pocket.

2. A film jacket as set forth in claim 1, wherein said spacing between said fixed portion of the cover member and said fixed portion of the surface sheet is slightly greater than the length of a square mount of film to be inserted into said pocket.

3. A film jacket as set forth in claim 1, wherein said base sheet is made of a transparent plastic sheet.

4. A film jacket as set forth in claim 2, wherein said base sheet is made of a translucent plastic sheet.

5. A film jacket as set forth in claim 1, wherein said base sheet has at least one hole for filing.

6. A film jacket as set forth in claim 1, wherein said base sheet is made of a sheet of paper.

7. A film jacket as set forth in claim 1, wherein a plurality of said surface sheets and a plurality of said cover members are provided for forming a plurality of the pockets.

8. A film jacket as set forth in claim 1, wherein provision is made of a tongue formed by cutting and bending that portion of said base sheet which is slightly lower than said open edge of each surface sheet and adapted to be engaged with said open edge of said surface sheet through said cover member.

9. A film jacket as set forth in claim 1 wherein said cover member comprises a tongue formed of a resilient piece secured at its upper edge to said base sheet so as to be engaged with said open edge of said surface sheet.

10. A film jacket as set forth in claim 1, wherein provision is made of an opaque printed film on that portion of said jacket which is opposed to perforated portions of the film to be inserted into said jacket.

11. A film jacket according to claim 1, wherein said at least one surface sheet and said at least one cover sheet have confronting edges separated from each other by a slit prior to insertion of the film.

12. A film jacket for receiving and for holding a film having a length dimension and a width dimension less than the length dimension, the film having a central image bearing portion positioned between marginal side portions, said film jacket comprising:
   a base sheet;
   a plurality of surface sheets disposed in parallel with each other on the base sheet, each surface sheet being resilient and having a bottom edge and two side edges fixed to the base sheet, the upper edge of the surface sheet being free from the base sheet so that a pocket is defined between the surface sheet and the base sheet, the distance between the bottom edge and the top edge of each surface sheet being such that all of the image bearing portion of the film is received within the pocket and a marginal portion of the film protrudes from the pocket; and a plurality of cover members fixed at only one edge to the base sheet and extending between side edges thereof for covering said portion of the film protruding from the pocket, one of said cover members being affixed to the base sheet above each of said surface sheets, each cover member being resilient and having an upper edge fixed to the base sheet and a lower edge located adjacent to the upper edge of the surface sheet, the spacing between the bottom edge of the surface sheet fixed to the base sheet and the upper edge of the cover member being slightly greater than the width dimension of the film for reliably holding said film by pressing of one surface of the top edge of the film against the resilient cover member and by frictionally engaging the opposed surface of the top edge of the film with the base sheet, and by pressing of one surface of the bottom edge of the film against the resilient surface sheet and by frictionally engaging the opposed surface of the bottom edge of the film with the base sheet of the film.

13. A film jacket according to claim 12, wherein the film has a plurality of image bearing portions and a perforated marginal portion, the dimensions of the pocket being such that the marginal portion protrudes from the pocket and is covered by the cover member.

14. A film jacket according to claim 13, wherein side edges of the cover members are movable with respect to the base sheet so that bottom edges of said cover members are movable away from said base sheet to facilitate insertion of film into said pockets.

15. A film jacket according to claim 12 or 14, wherein said base sheet has filing holes formed in an edge thereof, the bottom edges of said surface sheets being parallel with the edge of the base sheet having the filing holes, the pockets formed by said surface sheets extending between side edges of said base sheet so that said pockets are sized to receive film having a plurality of image bearing portions.

* * * * *